No. 776,448. PATENTED NOV. 29, 1904.
E. YOUNG.
LUBRICATOR FOR HANDSAWS.
APPLICATION FILED FEB. 8, 1904.
NO MODEL.

Witnesses
Charles H. Ward
Emily Ward

Inventor
Edward Young

No. 776,448. Patented November 29, 1904.

UNITED STATES PATENT OFFICE.

EDWARD YOUNG, OF JEFFERSONVILLE, OHIO.

LUBRICATOR FOR HANDSAWS.

SPECIFICATION forming part of Letters Patent No. 776,448, dated November 29, 1904.

Application filed February 8, 1904. Serial No. 192,672. (No model.)

*To all whom it may concern:*

Be it known that I, EDWARD YOUNG, a citizen of the United States, residing at Jeffersonville, in the county of Fayette and State of Ohio, have invented certain new and useful Improvements in Lubricators for Handsaws, of which the following is a specification, reference being had therein to the accompanying drawings.

This invention relates to certain new, useful, and novel features of improvements in lubricators for handsaws; and the invention consists of a neat, compact, and well-protected device wherein oil or any other suitable fluid is stored readily to be had and applied just when needed. Its simple arrangement of construction, its ready removal and adaptation to handsaw-handles as now in general use, and its thoroughness and completeness for which it is intended fills a long-felt want, all as will be more fully described and claimed in the following.

Reference is to be had to the accompanying drawings, forming a part of this specification, in which similar characters of reference indicate corresponding parts in all the views.

Figure 1:
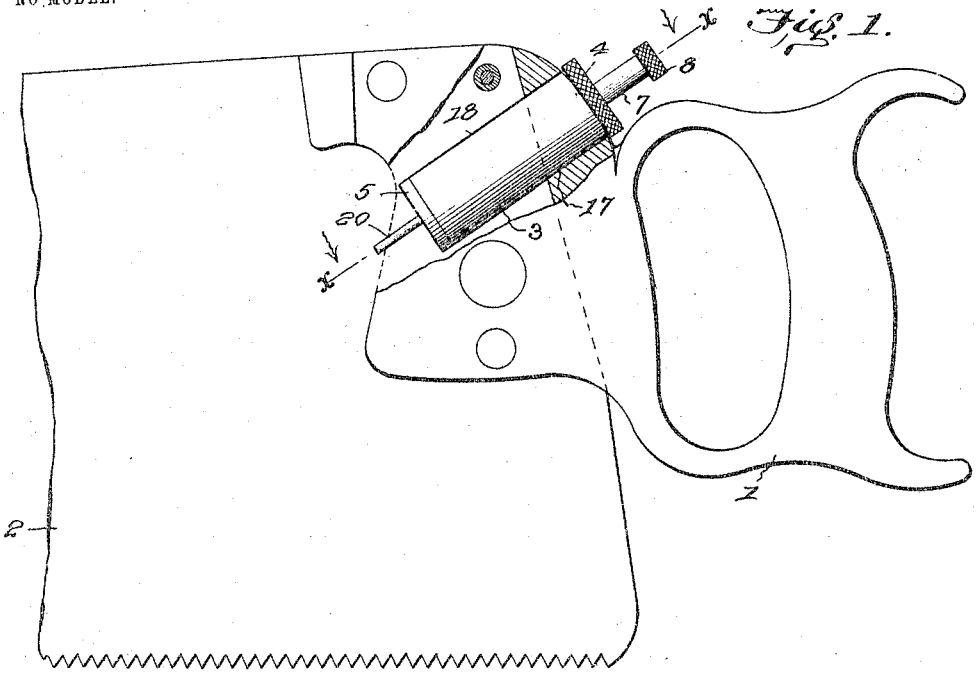
Figure 2:
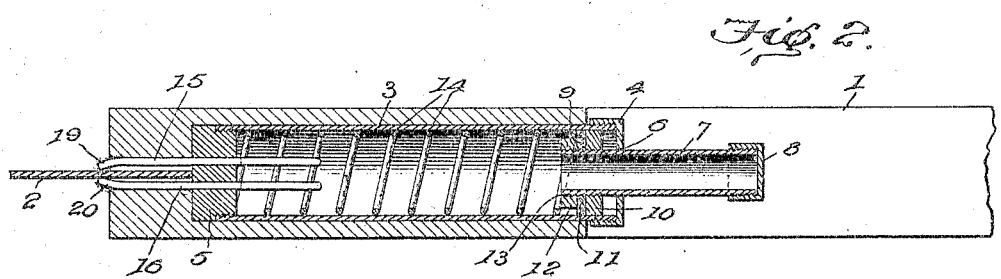
Figure 3:
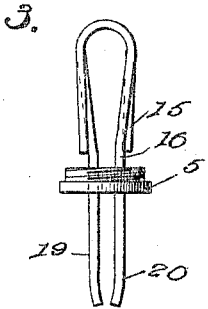

Figure 1 is a side view of my invention, the handle of the saw being broken away for clearness. Fig. 2 is a sectional view of same, taken on line *x x* of Fig. 1 looking in the direction of the arrows; and Fig. 3 is a detached side elevation of the siphoning device and its fastening means.

In the drawings, 1 is an ordinary saw-handle, and 2 a saw-blade. The lubricant cup or reservoir 3 is substantially circular in cross-section and is substantially closed at its upper and lower ends by the caps 4 and 5, respectively. These caps are screw-threaded, as shown, thereby forming a receptacle wherein lubricant can be stored for a considerable length or period of time, for it is a frequent occurrence that a mechanic is often far removed from where his lubricant is stored and is often compelled to lose considerable time or else do without any, whereof with my invention it is always within easy access and reach, and the necessary amount of lubricant can immediately be applied.

The cap 4 is provided with a central longitudinal aperture 6, through which extends the force feeding device. Said force feeding device consists of a hollow tubular portion 7 of the same general contour as the receptacle 3, but of a greatly reduced diameter, which is adapted to be used as a means of supplying the receptacle with the necessary lubricant whenever needed. The outer end of this tube 7 is screw-threaded and adapted to receive a screw-threaded cap 8, which serves as a positive means of keeping the lubricant within the receptacle, and this tubular portion also performs a further useful function as a means or a pusher device for the operator in supplying lubricant to the saw-blade. The inner end of said tubular portion is provided with means for forcing the lubricant out, which means consists of a plunger 9, having a metallic ring 10, a flexible or yielding ring 11, and a nut 12. Said nut is adapted to fit the threaded portion 13 of the tube, serving as a binding means for holding the plunger in position and which at the same time allows of the ready removal of the old and worn parts and the replacing of a new plunger. A coil-spring 14, fitting within the receptacle, its ends bearing against the bottom of the receptacle and against the plunger, respectively, forms a positive means for the return of the plunger to its normal position, being sufficiently strong to allow of its easy compression by said plunger and to return the same when the plunger has been released.

The oil or lubricant is fed onto the saw-blade by means of a siphoning device which consists of two hollow wire tubes 15 and 16, formed, as shown, into a siphon-like device. This construction is not only advantageous by reason of its feeding only a certain or limited quantity of lubricant simultaneously to the both sides of the saw-blade, but of simplicity and positiveness of operation and the extreme cheapness of manufacture, and while the plunger is returning to its normal position by means of the spring 14 air is gradually being drawn in, replacing the amount of lubricant just previously discharged. This incoming of air tends to keep the siphon-like tubes clean and clear of any lubricant that may happen to stick to their inner walls, thus preventing any possibility of combined lubricant and dirt or any foreign substance from clogging or choking the passage-ways of the siphon-like tubes, and the amount of air thus drawn in materially aids in the next discharge, as it assumes the place between the plunger and the remainder of the lubricant on account of its much greater lightness.

The handle 1 of the saw has a cavity or circular recess 17 formed therein, which is adapted to form a means of holding the reservoir 3 and of being a protection to the reservoir from all knocks and blows to which articles of this class are frequently subjected.

The saw-blade proper has a recess 18, which registers with the cavity 17 of the handle and between the walls of which the reservoir rests and is held from any farther downward movement.

As shown, the siphoning device is securely held in position by the cap 5, which is provided with two apertures just sufficiently large enough to allow the ends or projections 19 and 20 to extend far enough out on either side of the saw-blade to insure a positive feed of oil or lubricant directly onto the saw-blade.

In practice when it is desired to lubricate the saw-blade the operator simply pushes the portion 7 until the desired amount of lubricant is obtained, and a release of the portion 7 or push-rod enables the spring to perform its required function and set the plunger for the next further operations, and it is obvious that this can be repeated over and over again as long as a supply of oil or lubricant is within the receptacle 1.

My device is cheap, simple, and durable. All the parts are practically separable and can be readily replaced whenever worn or broken.

There are no valves to set nor to clog, no parts to be put out of order, and, moreover, it can be knocked down and thoroughly cleaned and rebuilt without the least fear of a single misapplication of any of its parts.

I do not wish to be understood as limiting myself to the precise details of construction as hereinbefore described, and shown in the accompanying drawings, as the same may obviously be modified without departing from the principle of my invention.

Having thus fully described my invention, what I claim as new, and desire to secure by Letters Patent, is—

1. A handsaw-lubricator, comprising a main hollow cylindrical portion, closure means at both ends thereof, a double siphon-like device at its lower end, forming independent and simultaneous means to deliver lubricant to the saw-blade, a plunger within said cylindrical portion, a coiled spring below said plunger forming a returning means for said plunger after it has been operated upon, said plunger consisting of a hollow tube smaller in diameter than the main cylindrical portion, whereby lubricant is fed to the said main portion, and a threaded cap is adapted to close said hollow tube at its upper end, thereby preventing any leakage of the lubricant, substantially as described.

2. A handsaw-lubricator, consisting of a double siphon-like discharge-nozzle for delivering lubricant positively to both sides of the saw-blade simultaneously, means for causing said siphoning-discharge, said means consisting of a hollow spring-actuated plunger and forming a means of refilling said reservoir by this hollow plunger, substantially as described.

3. A handsaw-lubricator, consisting of a tubular casing, a double siphon-like discharge-nozzle therein, each being independent of the other and both operating simultaneously, each extending sufficiently far to project beyond its fastening means to straddle the saw-blade delivering lubricant accurately and positively to both sides of the blade, and a positive means for actuating said siphon-like device which causes the discharge of the lubricant, substantially as described.

4. A handsaw-lubricator, having a double-discharge siphon-like means secured in its removable bottom, a removable top or cap suitably apertured, forming a bearing for the hollow plunger, said plunger being closed at its upper or exposed end and open at its lower end, whereby lubricant may be supplied to the main chamber, a plunger device secured about the lower end of said hollow tube, consisting of a suitable ring or rings of packing which frictionally engage the inner walls of said main tubular casing and are adapted to be removably held in place by a suitable screw-threaded means fitting said screw-threaded lower end of said plunger, substantially as described.

5. The combination of a handsaw, the blade of which is recessed in its upper rear edge and and the handle of said handsaw being provided with a cavity juxtaposed to the recess, and a lubricant-reservoir being seated in said recess and held in such position by the cylindrical walls of the cavity, a spring-return plunger within said reservoir whereby lubricant is supplied to the saw-blade said plunger means being hollow and forming a means for refilling the reservoir, a closure-cap thereon, and a double siphon-like device which conveys said lubricant to the saw-blade simultaneously to both sides, substantially as described.

In testimony whereof I affix my signature in the presence of two witnesses.

EDWARD YOUNG.

Witnesses:
C. W. AUGUSTUS,
U. G. CREAMER.